United States Patent

[11] 3,608,036

| [72] | Inventor | James Bruce Peeso, Jr.<br>Stamford, Conn. |
|---|---|---|
| [21] | Appl. No. | 833,564 |
| [22] | Filed | June 16, 1969 |
| [45] | Patented | Sept. 21, 1971 |
| [73] | Assignee | American Cyanamid Company<br>Stamford, Conn. |

[54] MAKING PLASTIC SPINNERETTES
3 Claims, 13 Drawing Figs.

[52] U.S. Cl. .................................................. 264/158,
264/225, 264/291, 264/313
[51] Int. Cl. ...................................................... B29c 17/02,
B29c 17/10
[50] Field of Search .......................................... 264/225,
220, 313, 317, 157, 158

[56] References Cited
UNITED STATES PATENTS
1,577,886  3/1926  Willshaw ...................... 264/313

| 2,535,100 | 12/1950 | Sourwine ...................... | 264/317 X |
| 2,623,241 | 12/1952 | MacKay ....................... | 18/8 |
| 3,156,950 | 11/1964 | Walton ......................... | 18/8 |
| 3,496,633 | 2/1970 | Michie ......................... | 264/219 X |

FOREIGN PATENTS
469,161  1937  Great Britain ................  264/313

Primary Examiner—Robert F. White
Assistant Examiner—Richard R. Kucia
Attorney—Philip Mintz ABSTRACT: Spinnerettes are formed by casting and hardening plastic resin around an array of attenuable fibers, leaving one end of the fibers outside the casting. The fibers are thereafter extracted by applying a tensile force to their free ends to stretch the fibers and thus attenuate their cross-sectional dimensions. This causes the surfaces of the fibers to pull away from the cast resin and leave channels through the resin exactly conforming to the cross-sectional configuration of the fibers. Using this process spinnerettes can be formed as easily with precise noncircular holes as with circular holes.

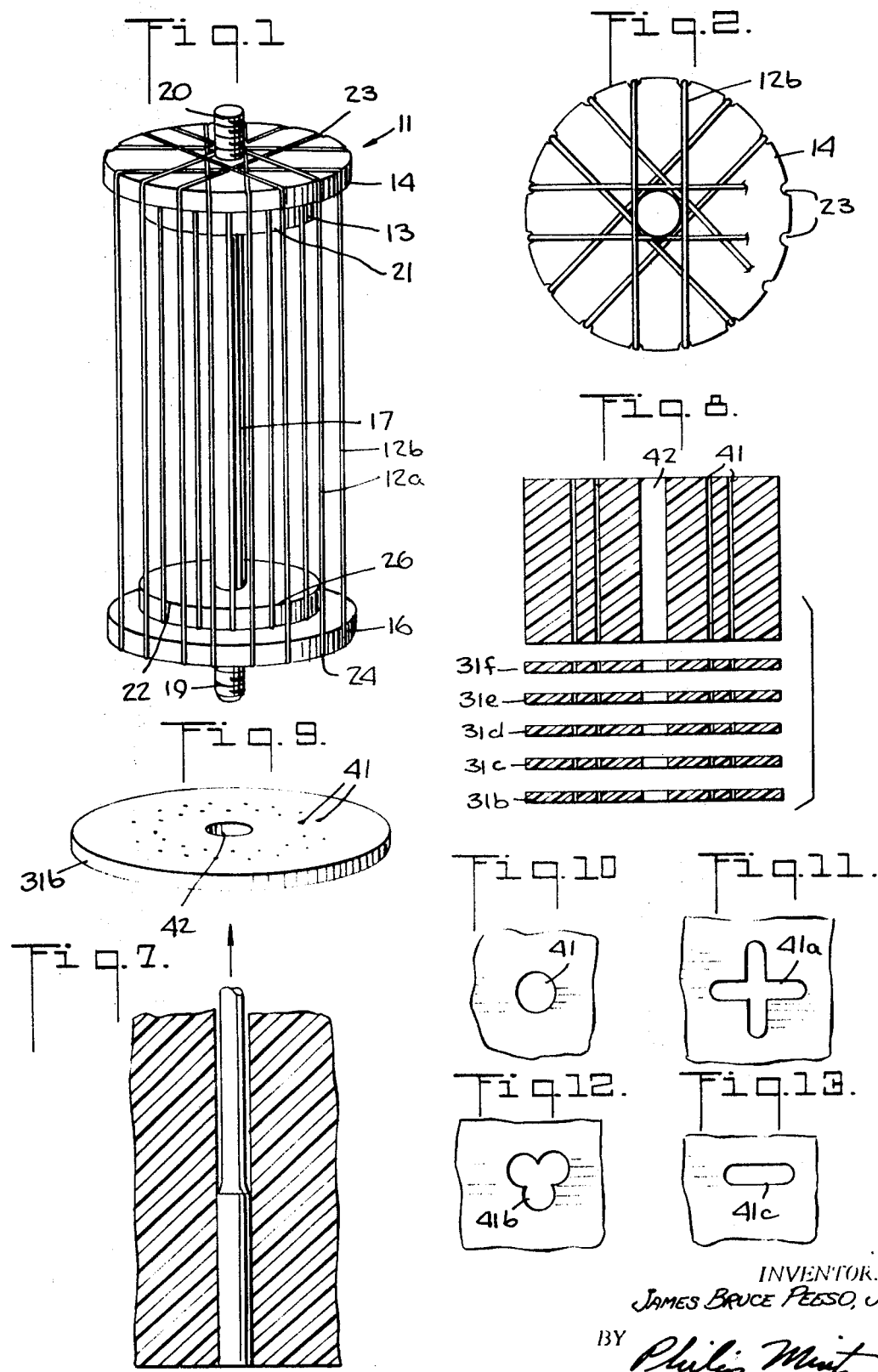

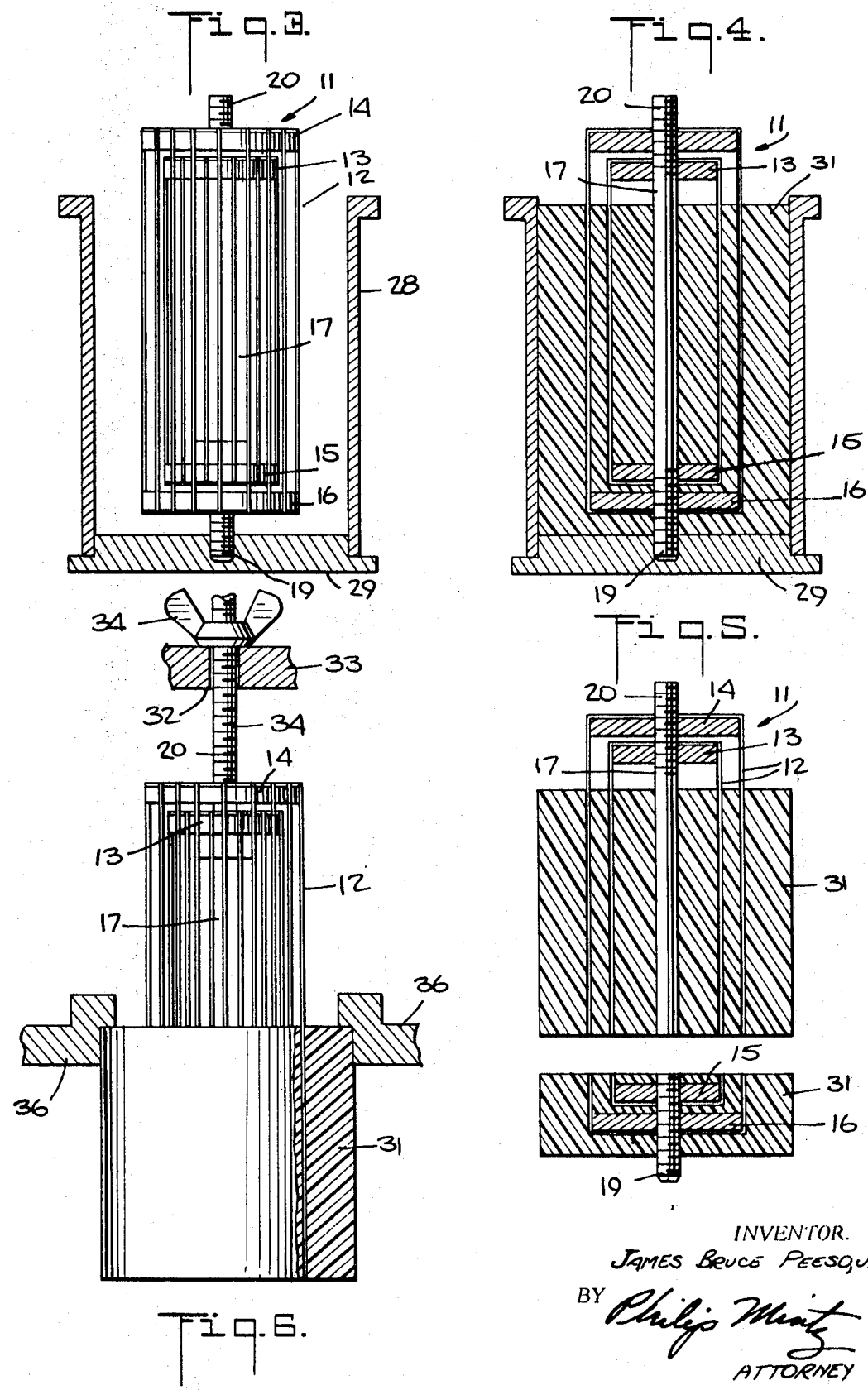

MAKING PLASTIC SPINNERETTES

BACKGROUND OF THE INVENTION

In the production of synthetic fibers by a process that includes the step of forcing raw material through the orifices of a spinnerette to form strands of the fiber, the size and cross-sectional shape of the strands is determined at least in part by the size and shape of the orifices, although the environmental conditions also have an effect. Among these conditions are the temperature of the material, heat flow, pressure on the material, smoothness of the orifices, form factors of the spinnerette channels, and relationships between these and other conditions. Because so many of these things are determined by the spinnerettes, a great deal of thought, care, and experimentation has gone into techniques that facilitate manufacture of spinnerettes according to exacting standards.

For the most part, formation of extrusion openings, or orifices, in spinnerettes for synthetic filament spinning apparatus generally has been accomplished by punching or drilling the desired hole shapes in metal cups or plates Other techniques that have been employed are spark and chemical erosion of the metal and even the use of electron beams and lasers. Such fabricating methods are relatively expensive, and especially so because of the necessity to provide uniform apertures with edge sharpness and the smoothness, or surface finish, required. Most important, it is rare that any two spinnerettes so produced will be as identical as desired.

To overcome these problems and particularly to reduce cost, techniques have evolved for casting spinnerettes of thermosetting resins and the like. In my copending application Ser. No. 723,696, means are described and claimed for making spinnerettes by casting a hardenable material, such as epoxy resin, around the teeth of an array of comblike mandrels consisting of thin metal strips. When the material is hard, the teeth are withdrawn, thus forming the orifices. While this procedure has proved to be a great improvement over any prior technique, it has certain disadvantages. For instance, each spinnerette requires a separate casting and although many spinnerettes may be made from a single array of mandrels, there is always the possibility of damaging the array, or die, between castings, thus losing the uniformity between spinnerettes, which is so desirable. In addition, there is a limit to the thickness of the casting from which the rigid teeth of the die can be withdrawn without their breaking. Thus it is difficult to achieve a high capillary ratio; i.e., the ratio of the length to the cross-sectional area of the orifice.

The teeth of the comblike plates that made up these dies can be formed with a rectangular cross section, but to give them any other cross section raises some difficulties. Extrusion openings or orifices of special or odd shapes i.e., of noncircular cross sections, have become increasingly important to the formation of fibers having specifically engineered properties, such as selected resilience, light refraction, and fabric bulkiness.

There exists, therefore, a continuing need for improvements in the part of making spinnerettes, particularly when relatively large numbers of identical spinnerettes are required.

The present invention overcomes the difficulties described above and represents a simple but extremely important contribution to the art.

Generally speaking, in the production of synthetic filaments, a filament-forming material in liquid phase; e.g., either a solution or a melt, is spun by extrusion under pressure through the jet openings, or orifices, of spinnerettes into chambers or cabinets where the streams solidify by cooling or solvent removal. Wet, dry and melt-spinning systems all include such spinnerettes for converting suitable raw materials into filaments and are so well known as not to need illustration or detailed description herein.

It is also well known that the orifices of spinnerettes may be circular or polygonal or may be formed with other cross-sectional shapes, and the extrusion of the filament-forming material, i.e., spin dope or melt, through any such orifice results in the formation of a filament having a cross-sectional shape determined by the shape of the opening and to a certain extent by such other factors as the nature of the material, the manner and rate of solidification or coagulation and the jet stretch; i.e., the ratio of takeup speed to extrusion speed.

Although not known prior to a copending application Ser. No. 696,495, assigned to the same assignee, in certain cases of wet spinning, the spinnerette material of construction is of major importance to forming filaments of polyacrylonitrile having nonround cross section. As disclosed in that application, the spinnerette must be constructed of a low thermal conductive material, such as a casting resin, in order to be operative. Thus, for certain uses, both nonmetallic spinnerettes and nonround cross sections are essential.

The present invention is principally concerned with the manufacture of plastic spinnerettes for wet-spinning fibers of acrylonitrile polymer having the capability of high capillary ratios in the finished orifices, and a high degree of uniformity among duplicate members with a minimum of expense and technical difficulty.

SUMMARY OF THE INVENTION

Briefly stated, the invention is practiced by first forming a matrix of hardenable plastic material around a set of attenuable filaments arranged alongside each other and having a portion of their length extending perpendicularly beyond one surface of the mass. At its introduction the plastic material is not solid, and the filaments are left in place until it does harden, after which they are pulled from the matrix, leaving holes that conform precisely to the configuration of the filaments. Thereafter, the matrix is sliced to obtain a series of identical spinnerettes.

A unique requirement of the invention pertains to the use of attenuable filaments to form the spinnerette orifices. According to the process described in my aforesaid application Ser. No. 723,696, the plastic material is hardened into a rigid mass in exact conformity with the rigid teeth of a comblike die. As a result there is a frictional force that holes the teeth and resists withdrawing the die from the hardened plastic. This frictional force can only be overcome by tensile force exerted along the length of the teeth, but the required small cross-sectional areas of the orifices make it necessary to form the teeth with correspondingly small cross sections. The tensile strength of the teeth is relatively low and may be exceeded by the frictional force, causing the teeth to break off inside the orifices.

Attenuable, or stretchable, filaments, however, may be easily removed from the matrix. This is because when such materials are stretched, there is an increase in their length and correspondingly a decrease in their cross section. When these materials are pulled from the matrix, this reduction in cross section causes a void between the material and the matrix since the stretched cross section is less than the cross section of the hole as determined by the unstretched filaments. Furthermore, the invention can produce almost any number of identical spinnerettes by simply slicing the discs to have equal thicknesses. Other advantages will become apparent from the specification and drawings.

In the drawings, which illustrate the method of making the cast spinnerettes of this invention, one embodiment form of apparatus is shown for the purpose of illustration only.

FIG. 1 is a perspective view of frame strung with filaments about which material may be cast.

FIG. 2 is a top view of the frame of FIG. 1.

FIG. 3 is a cross-sectional view of a mold with the frame of FIG. 1 placed in it.

FIG. 4 is a cross-sectional view of the mold of FIG. 3 with plastic material substantially filling the empty space within the mold.

FIG. 5 shows the plastic material and frame of FIG. 4 after removal from the mold and after one end has been cut off of the frame and the hardened material.

FIG. 6 shows extracted apparatus for extracting the remainder of the frame and the filaments from the hardened plastic of FIG. 5.

FIG. 7 shows an enlarged cross-sectional view of one portion of the filament and hardened material during the extraction of the filament from the material.

FIG. 8 shows the hardened material and several slices cut off from one end of it.

FIG. 9 is a perspective view of one of the slices shown in FIG. 8.

FIG. 10 is an enlarged end view of a round orifice in the slice shown in FIG. 9.

FIG. 11 shows a cruciform orifice in the slice of material in FIG. 9.

FIG. 12 shows a trilobal orifice in the slice shown in FIG. 9.

FIG. 13 shows a laterally elongated orifice in the material in FIG. 9.

DETAILED DESCRIPTION OF THE INVENTION

FIG. 1 shows one form of frame 11 that may be used for preassembly of an attenuable filament 12 comprising filament sections 12a and 12b. In this case two pairs of notched wheels 13–16 are attached to opposite ends of a rod 17. The wheels 13 and 15 are the same diameter, and the wheels 14 and 16 are the same diameter, which is larger than the wheels 13 and 15. One way of assembling the notched wheels onto the rod is by providing threaded openings in the wheels and threaded ends 19 and 20 on the rod 17. The rod 17 and the wheels 13–16 should be rigid enough so as not to be affected by the relatively slight stress due to winding the filament 12 around the wheels from end to end, as shown.

A first filament may be attached to the wheels 13 and 15 by being laid in the notches 21 and 22 as individual lengths of filament stretching only from one end of the frame to the other or, as shown in FIG. 1, a single, long piece of the filament 12a may be traversed or wound many times back and forth between the wheels 13 and 15. Preferably the notches 21 on the wheel 13 are arranged so as to be directly above corresponding notch 22 in the lower wheel 15 so that all straight sections of the filament 12a between the wheels are parallel to each other and parallel to the rod 17, although this is not absolutely essential. After the wheels 13 and 15 have been strung, the wheels 14 and 16 may be placed on the rod 17 for stringing. Notches 24 in the wheel 14 may be located directly above notches 26 in the wheel 16 in a manner similar to the notches 21 and 22 on the wheels 13 and 15. The filament 12b may then be strung between the wheels 14 and 16 by being laid in the notches 23 and 24. In this way the filament 12 is arranged on two concentric cylindrical surfaces, the diameters of which are determined by the diameters of the wheels 13 and 15 on the one hand and the wheels 14 and 16 on the other. Of course, additional pairs of wheels, similar to the aforementioned wheels, can be used when additional concentric rings of orifices are desired.

FIG. 2 shows a typical pattern in which the filament 12 is strung across the outer surface of the top wheel 14 so as to fall evenly into each of the notches. In stringing the filament on the wheels 13–16 it is desirable to apply an even pressure so that the individual straight sections of the filament 12 between the upper wheels and the lower wheels will be under equal tension. Also care must be taken to see the filament does not slip in the notches in such a way as to change the tension on individual sections of the filament as the winding progresses which would cause some of the orifices to be larger than others, since the size of the final, extruded fibers may vary much more than the size of the orifices.

In the case of filaments of noncircular cross section it may also be necessary to ascertain that the filament is not twisted, at least not those sections between the upper and lower sets of wheels. Any twisting of noncircular filaments across the surface of the wheel, that is, the portions of filament 12b shown in FIG. 2, would have no effect on the resultant molded structure.

After the frame 11 has been entirely wound, it may be put into a mold comprising a substantially cylindrical, but preferrably slightly tapered sidewall 28 and a bottom wall 29 into which the end 19 of the rod 17 may be screwed so as to be self-supporting. Thereafter a quantity of hardenable material 31 may be poured into the mold up to a level that preferrably stops below the wheel 13.

The material 31 may be a resin, such as an epoxy, a polyurethane, or a polyester. The resin may also be mixed with a powdered metal or some other additive to alter its conductive or other physical features. It is essential that the resin 31 and the material for the filament 12 be mutually inert in all of the conditions encountered during the casting process so that the filament can be drawn out of the plastic after the material 31 has hardened. This means that the filament material must not be chemically affected by the resin and that the temperature of the resin must never exceed the temperature at which the filament softens substantially or melts.

The material 31, to which a suitable catalyst may be added, is deaerated in a vacuum and poured into the mold around the frame 11 up to a level below the upper ends of the free parts of the filament 12. The material 31 must conform precisely to the surface of the filament without any bubbles. While the notched wheel 16 is shown in FIGS. 3 and 4 as being located some distance from the bottom wall 29 of the mold, it may, in fact, be placed directly against the bottom wall so that little, if any, of the resin 31 will flow into such space as remains. After casting, the material 31 is preferably cured but not at a temperature high enough to have an adverse effect on the filament 12.

As shown in FIG. 5 that hardened material 31 may be removed in a block from the mold with the frame 11, including the rod 17 and the wheels 13–16 still joined together. After removal of the material, the lower portion may be sliced off just above the upper surface of the wheel 15, leaving the rod 17 and the upper portions of the straight lengths of the filament 12 intact.

Severing the lower end of the rod 17 frees the upper end so that it can be extracted together with what remains of the filament 12. The necessary force may be applied by extending the threaded end 20 of the rod 17 up through an opening 32 in a fixed member 33 and screwing a nut such as the wing nut 34 onto this threaded end to apply upward pressure to the rod 17 and thereby to the upper ends of the filament 12. A fixed member 36 holds the block of hardened material 31 down as the rod and upper ends of the filament are pulled up. In this way the rod is withdrawn from the hardened material by direct force and the upper filament portions are attenuated and thereby drawn out of the hardened material, leaving channels 37 therethrough that correspond exactly to the shape of the filament. The rod 17 may be slightly tapered to facilitate its removal from the hardened material 31.

FIG. 7 shows the effect of applying upward force in the direction of the arrow 38 to one length of filament 12 which is shown greatly magnified. This upward force elongates the filament and attenuates its cross section as shown in the region 12c. This attenuation of the cross-sectional area of the filament pulls the surface of the filament directly away from the face surface 31a of the hardened material 31 rather than sliding the filament along the surface of the material 31. Preferrably the filament 12 should be as smooth as possible so as not to interlock mechanically with the surface of the material 31, but because the attenuation of the filament 12 pulls its surface almost perpendicular away from the wall of the channel through the material 31, more slight irregularities in the surface of the filament may be tolerated than would be the case if the filament did not attenuate.

After the rod 17 and the filament sections 12 have been extracted from the hardened material 31 leaving a single monolithic block as shown in FIG. 8, the block may be sliced in a direction perpendicular to the channels 37 left by the filament sections 12a and 12b and the channel 39 left by the rod 17. Slices 31b–f may be formed in this fashion, and prior to their being severed from the main block 31, it may be desirable to fill all of the channels with grout to support the hole edges and to prevent resin chips from being forced into the holes during machining. Suitable grouting materials are: gelatin, Wood's metal, para-dichloro benzene and water glass. It has been found desirable to degrease the spinnerette blank with methyl chloroform or trichloroethylene to facilitate the application of the grouting material. The grouting material may be applied in a vacuum desiccator.

One of the advantages of the present invention is that it makes possible the formation of spinnerettes as thick as may be desired to withstand pressure of the spin dope that would deform normal spinnerettes. Therefore, the slices, such as the slice 31b shown in FIG. 9 may be quite thick. This slice is in condition for use as a spinnerette, although it may require polishing of the flat surface. Polishing preferably is accomplished with the grout still in place at least in the channels, or orifices, 27. The channel 39 preferably is filled with a more permanent material that bonds directly to the rest of the material of the slices 31b. After completion of the polishing action the grout may be dissolved from the orifices 37 to leave them entirely clear of any obstruction.

Although only a few orifices 37 are shown in the spinnerette plate 31b, and these orifices are arranged in two concentric circles by virtue of the configuration of the original frame shown in FIG. 1 it is not necessary that the placement of the orifices be as shown. They may be located on more concentric circles or in other array. Furthermore, although in many cases it is desirable for all of the orifices to be as identical as possible in size and shape, it is also possible to utilize the present invention to produce, in one spinnerette, orifices of more than one shape or size so as to provide for the formation of a filament bundle composed of a mixture of filaments of correspondingly different cross sections.

FIGS. 10–13 show various configurations of the orifices 37. The simplest type of orifice is the plain round hole shown in FIG. 10, but for various purposes such as preferential resilience of the final spun fiber or for optical refraction of light within the spun fiber, other orifice configurations may be desired such as the cruciform orifice 40 in FIG. 11, the trilobal orifice 41 in FIG. 12 and the elongated orifice 42 in FIG. 13.

Spinnerettes of the types herein described may be employed in wet-spinning and dry-spinning substantially all of the fiber-forming materials normally spun by those systems including rayon, acetate, acrylonitrile polymers and copolymers, polymers and copolymers of vinyl monomers such as ethylene, propylene, vinyl chloride, vinylidene chloride, vinyl acetate, etc., ethyl cellulose, vinyl alcohols and the like. The spinnerettes of this invention are not recommended for melt-spinning materials such as nylon, polyesters and the like, unless the melt extrusion temperatures are sufficiently below the decomposition temperature of the thermosetting resin composition of the spinnerette to insure that no damage to the spinnerette will occur. Similarly, in wet and dry spinning solutions of fiber-forming materials, solvents must be selected to which the spinnerette resin is inert.

In an actual test, a spinnerette was made in accordance with the previously described manner consisting of epoxy resin, having 71 round orifices, each being 338 microns in diameter and 6.25 mm. capillary length. A round nylon monofilament was used to form the orifices. A spinning dope containing 30 percent of a copolymer of 90 percent acrylonitrile and 10 percent methyl methacrylate dissolved in approximately 45 percent aqueous sodium thicyanate and heated to 81° C. was metered at a rate of 23 cc./min. through the spinnerette, forming filamentary streams in air which were subsequently drawn into an aqueous bath. Pressure on the spinnerette was measured at 240 p.s.i.g. at a calculated orifice velocity of 3.28 M/M. The spinnerette performed well and showed no indication or distortion or break due to the high pressure. Suitable materials for the filament 12 include polyolefin, polyester and particularly polyamide polymers. Nylon, which is available in a variety of shapes and sizes, is excellent due to its high strength and ability to elongate greatly even at room temperature. The hardenable casting material 31 may be any settable or thermosetting resin such as an epoxy resin.

This invention presents an additional possibility for simplifying the formation of noncircular fibers. An orifice of a size that can be made by other techniques, such as by means of an electron beam or other techniques known in the prior art can be formed as a master orifice. Then suitable filament material, such as nylon or the other materials referred to previously, can be extruded through this master orifice and partially stretched to attenuate their cross section thus resulting in a filament somewhat smaller than the dimensions of the master orifice. This filament can then be used to produce a single orifice spinnerette in accordance with the process set forth above. By taking care to attenuate the original filament only partially, it may be further attenuated to release it from the single orifice spinnerette. This process may then be repeated to produce successively smaller orifices until a final filament of the proper size is achieved. Of course, it is necessary that the successive spinnerettes formed in this multistage process be capable of operating at the temperatures required to form the successively smaller filaments. The temperature and pressures obtained in the formation of these filaments may be adjusted to produce filaments which, although not suitable for commercial sale because of being disclosed, are perfectly satisfactory for use as dies in forming the successively smaller orifices.

What is claimed is:

1. The method of casting spinnerette blanks comprising the steps of:
   A. forming an assembly of attenuable filaments extending in spaced relation to one another on a frame in predetermined generally parallel, spaced relation to each other, said frame engaging only end portions of said filaments;
   B. casting a hardenable material about said filaments to form a monolithic block said filaments and material being mutually inert;
   C. simultaneously pulling on one end of each of said filaments to attenuate its cross-sectional dimensions to simultaneously free them from engagement with said monolithic block to leave channels therethrough,
   D. filling said channels with grouting material; and
   E. severing said monolithic block substantially perpendicular to the channels therethrough.

2. The method defined in claim 1 wherein said filaments are of nylon.

3. The method defined in claim 1 wherein said resin is an epoxy resin.